United States Patent [19]

Dennis et al.

[11] Patent Number: 4,969,128

[45] Date of Patent: Nov. 6, 1990

[54] BOREHOLE ACOUSTIC LOGGING SYSTEM HAVING SYNCHRONIZATION

[75] Inventors: Charles L. Dennis; Will K. Lenhardt, both of Richardson, Tex.

[73] Assignee: Mobil Oil Corporation, Fairfax, Va.

[21] Appl. No.: 475,547

[22] Filed: Feb. 6, 1990

[51] Int. Cl.$^5$ .............................................. G01V 1/40
[52] U.S. Cl. ....................................... 367/25; 367/69; 367/911
[58] Field of Search .................. 367/35, 25, 69, 911; 181/105; 324/161, 166

[56] References Cited

U.S. PATENT DOCUMENTS

| 3,369,626 | 2/1968 | Zemanek, Jr. | 367/69 |
| 3,718,204 | 2/1973 | Groenendyke | 367/69 |
| 3,728,672 | 4/1973 | Dennis et al. | 367/69 |
| 4,575,677 | 3/1986 | Dennis | 324/161 |
| 4,736,348 | 4/1988 | Bednarczyk | 367/69 |
| 4,780,862 | 10/1988 | Clerke | 367/35 |
| 4,837,753 | 6/1989 | Morris et al. | 367/69 |
| 4,876,672 | 10/1989 | Petermann et al. | 367/35 |

Primary Examiner—Ian J. Lobo
Attorney, Agent, or Firm—Alexander J. McKillop; Charles J. Speciale; George W. Hager, Jr.

[57] ABSTRACT

An elongated borehole logging tool employs an acoustic energy transducer for directing acoustic energy pulses toward a borehole wall at a repetition rate synchronized with rotational speed of the tool within the borehole.

6 Claims, 3 Drawing Sheets

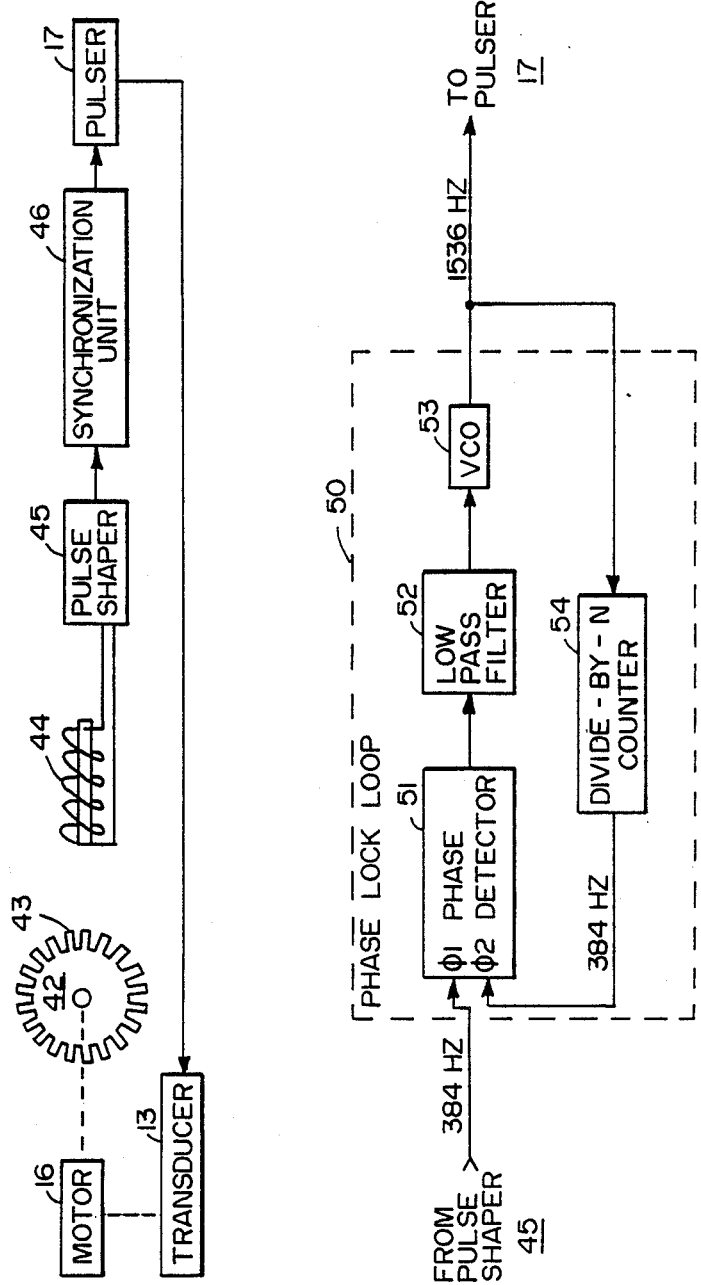

FIG. 4
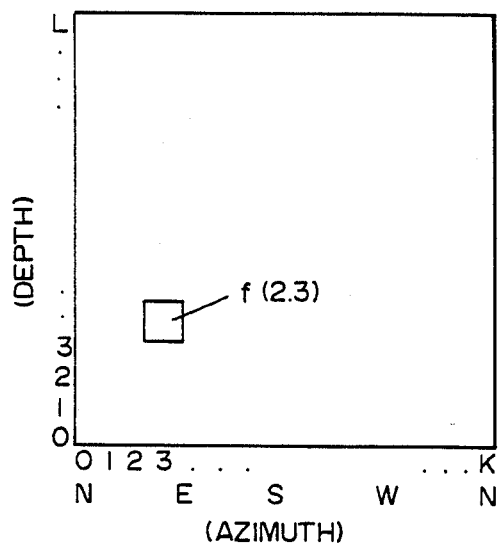
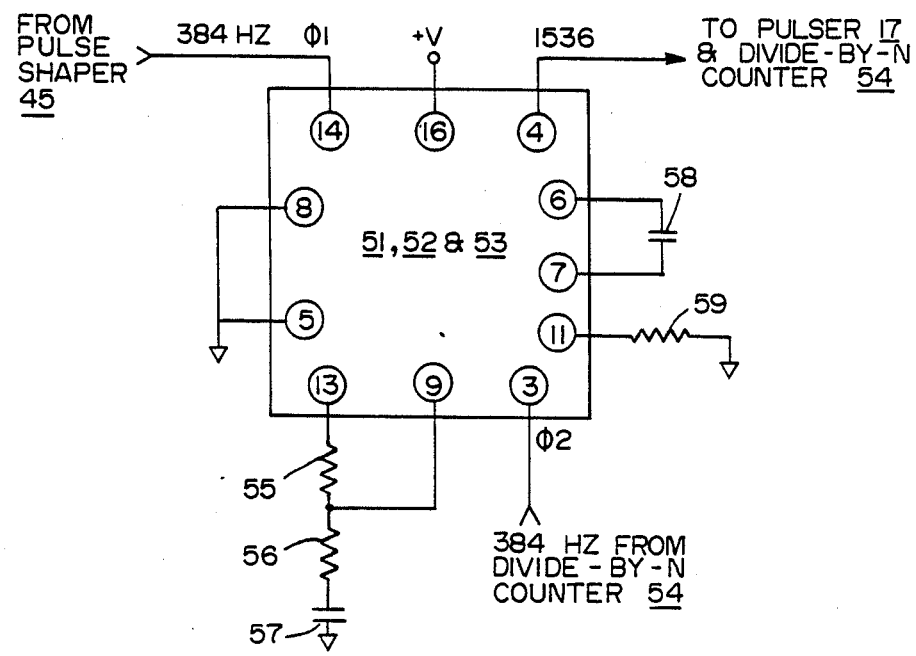
FIG. 5

BOREHOLE ACOUSTIC LOGGING SYSTEM HAVING SYNCHRONIZATION

BACKGROUND OF THE INVENTION

This invention relates to acoustic logging of boreholes and, more particularly, to a system for controlling an acoustic transducer to direct pulses of acoustic energy toward a borehole wall at a repetition rate synchronized with the rotational speed of the transducer within the borehole.

In U.S. Pat. Nos. 3,369,626 to Zemanek, Jr.; 3,718,204 to Groenendyke; and 3,728,672 to Dennis et al, there are disclosed methods of and apparatus for scanning the walls of a borehole with acoustic energy. In these patents a borehole televiewer logging tool employs a transmitter and a receiver of acoustic energy which are rotated within the borehole. The transmitter is cyclically energized to provide a beam of acoustic energy pulses for scanning the walls of the borehole. Reflected acoustic pulses are received by the receiver between transmitted acoustic pulses and are converted to reflection signals for recording on an electron beam display device. A sweep signal is generated each time the acoustic energy beam is rotated through a 360° scanning pattern. Such sweep signal is applied to the horizontal deflection plates of the display device to sweep an electron beam horizontally across the face of the display device. The reflection signals are applied to the Z-axis of the display device to intensity modulate the electron beam as the beam is swept across the face of the display device to provide a picture which is a function of the time or distance from the transmitter and receiver to the wall of the borehole and of the density of the borehole wall.

In both the above-described patents the combination of transducer rotation along with vertical movement of the borehole televiewer logging tool along the length of the borehole results in a continuous spiral of the borehole wall being scanned. The resulting display is a picture of the density of the material forming the walls of the borehole at different depth points. This scanning of the borehole wall permits the determination of the actual configuration of the borehole. In addition, it permits the determination of anomalies which may exist at different depths in the borehole. For example, these anomalies may be a fault or a fracture in the formations traversed by the borehole.

SUMMARY OF THE INVENTION

In accordance with the present invention there is provided a system for the acoustic logging of subsurface formations surrounding a borehole and more particularly to a borehole televiewer having synchronization of rotation and acoustic energy output of the acoustic energy transducer.

An elongated borehole tool employs an acoustic energy transducer for directing pulses of acoustic energy toward the wall of a borehole through a subsurface formation and for receiving direct reflections of such acoustic energy from the borehole wall. The transducer is rotated about a rotational axis parallel to the axis of the borehole by a motor which varies in rotational speed during each revolution due to a plurality of acceleration and deceleration cycles per revolution. An electrical signal is produced representative of the rotational speed of the transducer. The transducer directs pulses of acoustic energy toward the borehole wall at a repetition rate synchronized with its rotational speed as represented by such electrical signal so that the same number of acoustic energy pulses are produced during each revolution of the transducers and are directed toward the borehole wall at equally spaced azimuthal positions about the transducer's rotational axis.

In a further aspect the mechanical rotation of the transducer is converted into an electrical signal having a pulse rate that varies with the rotational speed of the transducer. More specifically, a wheel is rotated in synchronism with the transducer and employs a plurality of teeth equally spaced about its outer periphery. A sensor is spaced in juxtaposition with the wheel for detecting the rate of movement of the teeth past the sensor and for producing an electrical signal having a plurality of pulses with repetition rate representative of the rate of movement of the teeth of the wheel past the sensor. This electrical signal is converted into a transducer excitation signal having a pulse rate synchronized to rotational speed of the transducer.

In a still further aspect, a voltage controlled oscillator generates the transducer excitation signal with a pulse rate that is a multiple N of the repetition rate of the pulses of the electrical signal. This transducer excitation signal is divided by the multiple N and then compared in phase with the electrical signal to provide a phase error signal. This phase error signal is used for voltage control of the oscillator so that the pulse rate of the transducer excitation signal is phase locked to the pulse rate of the electrical signal whereby the rate at which the transducer directs acoustic energy pulses toward the borehole wall is synchronized with the speed variations of the motor during each revolution and the acoustic energy pulses are directed from the transducer at equally spaced azimuthal positions about the rotational axis of the transducer.

BRIEF DESCRIPTION OF THE DRAWINGS

FIGS. 2, 3 and 5 are electrical circuit diagrams of the circuitry employed in the present invention for synchronizing the generation of acoustic energy pulses by the transmitting transducer illustrated in FIG. 1 with the rotational speed of the transducer as driven by the motor illustrated FIG. 1.

FIG. 4 illustrates a two-dimensional light intensity function representing the display of acoustic reflection signals recorded with the borehole logging tool of FIG. 1.

DESCRIPTION OF THE PREFERRED EMBODIMENT

Figure 1:
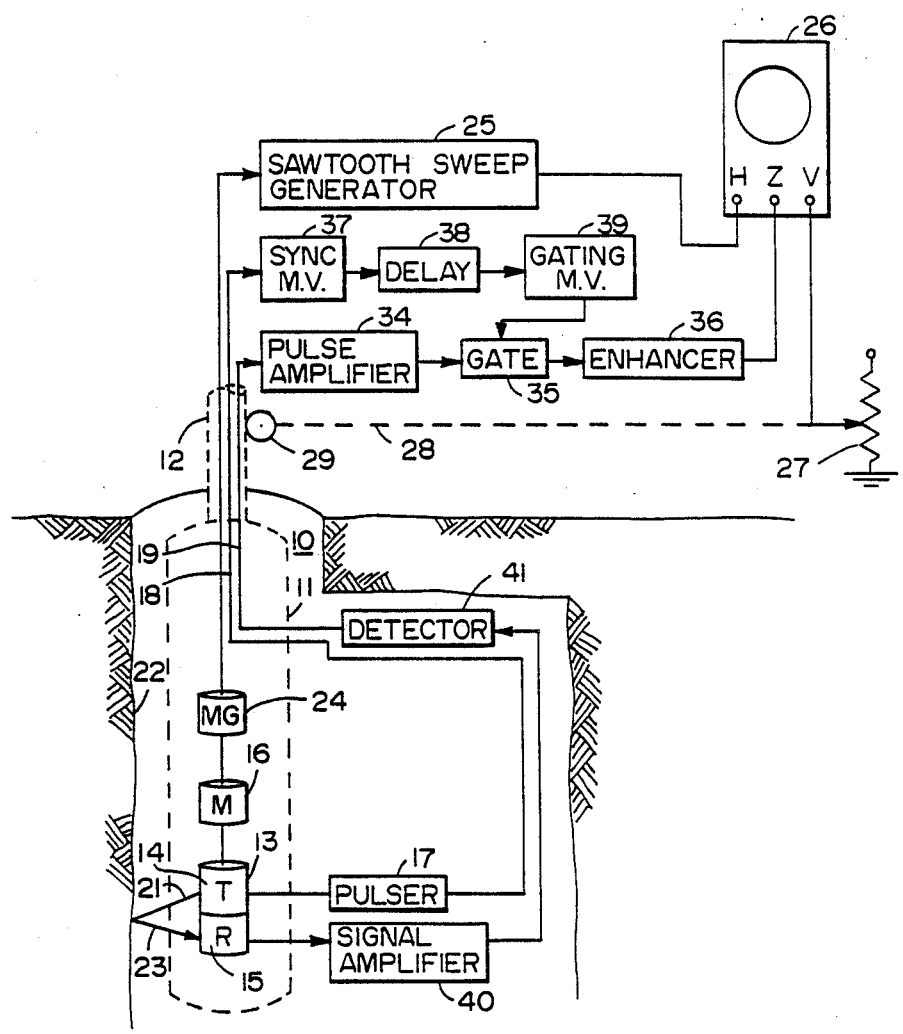
FIG. 1 illustrates a borehole logging tool with which the present invention may be utilized.

For the purpose of illustrating the type of borehole acoustic logging system with which the apparatus of the present invention may be employed, a general description of the logging system shown in FIG. 1 will be first presented, following which details of the apparatus of the present invention will be described.

Referring now to FIG. 1, a borehole televiewer logging tool 11 is lowered into borehole 10 by means of a logging cable 12. Logging tool 11 comprises a transducer assembly 13 which acts as both a transmitter and receiver of acoustic energy. The beam of high frequency acoustic energy is rotated within the borehole to circularly scan the walls of the borehole. Such rotation is effected by means of motor 16. While it is understood that transducer assembly 13 comprises a separate transmitter 14 and a receiver 15, a single transducer acting both as transmitter and receiver may be utilized. The transducer assembly 13 is rotated about the borehole axis by means of motor 16. The frequency of the acoustic energy transmitted by way of beam path 21 toward the wall 22 of borehole 10 is determined by the pulser 17.

Logging tool 11 also includes a magnetometer 24, mounted for rotation with the logging tool 11, which produces an output pulse each time magnetic North is detected during rotation. Such magnetometer output pulse is applied uphole to sawtooth sweep generator 25 which provides a horizontal sweep signal to the horizontal deflection plates of an electron beam display device 26 for horizontally driving an electron beam across the face of display device 26.

Each horizontal sweep of the electron beam across the display device 26 is displaced vertically from the start of the sweep to the end of the sweep in proportion to the vertical movement of the logging tool 11 within the borehole 10. Such displacement is provided by means of a potentiometer 27 which is coupled by electromechanical linkage 28 to a sheave 29 over which logging cable 12 passes. Vertical advancement of logging cable 12 along the borehole axis rotates sheave 29, such rotation causing electromechanical linkage 28 to vary the location of the wiper arm on potentiometer 27, thereby applying to the vertical deflection plates of display device 26 a voltage which is proportional to the depth of the logging tool within the borehole. The resulting picture displayed on display device 26 is a series of side-by-side, substantially horizontal beams, the start of each beam trace located at the vertical position on the face of the display device where the preceding beam trace terminated.

Reflected acoustic energy pulses 23 are received by the receiver 15 of transducer assembly 13, and signals representative of such reflections are applied to the Z-axis of display device 26 by way of a signal amplifier 40 and detector 41, located downhole, and a pulse amplifier 34, gate 35, and enhancer 36 located on the surface of the earth. Such input to the Z-input terminal of display device 26 serves to intensity modulate the electron beam in accordance with the amplitudes of the reflection signals.

Ordinary logging cables are not suitable for transmission of high frequency signals, such as 2 megahertz, to the surface; therefore, after being amplified by signal amplifier 40, the reflection signals are applied to detector 41 which generates a lower frequency signal in the form of the envelope of the reflection signals. Such lower frequency signals, preferably in the range of 20-50 kilohertz, can be transmitted to the surface over ordinary logging cable without appreciable signal loss. The output of detector 41 is applied to the input of pulse amplifier 34 by means of conductor 19.

Pulser 17 also provides an output to a sync multivibrator 37, delay 38, and gating multivibrator 39. The output of gating multivibrator 39 is an indication of the time period between transmitted acoustic energy pulses and during which reflected acoustic energy pulses are expected to be received at receiver 15, such output being applied to gate 35 to allow reflecting signals to pass from pulse amplifier 34 through gate 35 and enhancer 36 to the modulating input of display device 26.

When pulser 17 generates an excitation pulse, a portion of this pulse cross-feeds into receiver 15. Also, when a sync pulse is generated by pulser 17 and sent uphole via conductor 18, a portion of the pulse crossfeeds into receiver conductor 19. To prevent these cross-feed signals from intensity modulating the electron beam of display device 26, gate 35 is open only during that portion of time during which reflected pulses are expected to be received from the walls of the borehole. Each time a sync pulse is received by sync multivibrator 37, it triggers into its unstable state for an output for a period of time almost as long as the time period between transmitted acoustic pulses. At the same time that the output of sync multivibrator 37 goes positive, a delay monostable multivibrator 38 is triggered into its unstable stage for a period of time ending just prior to the anticipated arrival time of a reflected pulse at receiver 15. As the trailing edge of the output of delay multivibrator 38 goes negative, a gating monostable multivibrator 39 is triggered into its unstable state to generate a positive-going output, which triggers gating multivibrator 39 to provide a signal to gate 35 to allow passage therethrough of only those signals representative of reflected pulses. Therefore, only the envelopes of the reflection signals pass through gate 35 to enhancer 36.

Having now described a borehole televiewer logging system with which the present invention may be practiced, reference is made to FIGS. 2-5 along with the following detailed description of the apparatus of the present invention for use in controlling an acoustic transducer to direct pulses of acoustic energy toward a borehole wall at a repetition rate synchronized with the rotational speed of the transducer within the borehole.

Referring firstly to FIG. 2, there is shown in block diagram form the acoustic transducer synchronization feature of the present invention for use with the borehole televiewer logging system of FIG. 1.

A wheel 42 is rotated in synchronization with the motor 16 and the transducer 13. The outer periphery of wheel 42 contains a plurality of equally spaced teeth. In juxtaposition with wheel 42 is a sensor 44 which detects the mechanical rotation of wheel 42 by sensing the movement of teeth 43. Sensor 44 preferably comprises an electric coil wrapped around a magnetic core. As each tooth passes the sensor 44, an electrical pulse is produced by sensor 44 and shaped by pulse shaper 45. The rate at which such pulses are produced is dependent upon motor speed during each revolution which varies due to a number of acceleration and deceleration cycles corresponding to the number of poles present within the motor (i.e., a two pole motor having two acceleration and deceleration cycles per revolution). These pulses are utilized by synchronization unit 46 to control pulser 17 so that the transducer 13 produces the same number of acoustic energy pulses each revolution of motor 16 and the pulses are directed toward the borehole wall at equally spaced azimuthal positions about the rotational axis of the transducer 13 regardless of motor speed changes during each revolution.

Referring now to FIG. 3, there is shown in detail the components of the synchronization unit 46 of FIG. 2. Pulses from pulse shaper 45 are coupled to the $\phi 1$ input of phase lock loop 50 having a phase detector 51, a low pass filter 52 and a voltage controlled oscillator (VCO) 53. In a preferred operation of the borehole logging system the motor 16 rotates the transducer 13 at 6 revolutions per second and the wheel 52 employs 64 teeth. Therefore, the sensor 44 and pulse shaper 45 provide a 384 hertz electrical signal to the $\phi 1$ input of phase detector 51. The oscillator 53 is voltage controlled to produced a 1536 hertz transducer excitation signal to the pulser 17. This 1536 hertz transducer excitation signal is also coupled to a divide-by-N counter 54 which divides the 1536 hertz signal by 4 to provide a 384 hertz signal to the φ2 input of phase detector 51. Phase differences between the pair of 384 hertz signals input to phase detector 51 are caused by motor speed variations that vary the phase of the 384 hertz electrical signal from sensor 44 and pulse shaper 45. Detector 51 provides a phase error signal representative of such phase differences which passes through low pass filter 52 to control the voltage applied to the oscillator 53. This voltage control causes oscillator 53 to vary its output to reduce the phase difference to zero so as to maintain phase lock within the loop. This output is also applied as the excitation signal to pulser 17 to cause pulser 17 to excite transducer 13 for the production of acoustic energy pulses. Since this transducer excitation signal is derived from wheel 42 rotating with motor 16 and transducer 13 by way of a phase lock loop, it is in synchronism with transducer 13 rotation and causes transducer 13 to produce acoustic energy pulses at a repetition rate synchronized with motor speed variations each revolution. Accordingly, an equal number of acoustic energy pulses are produced each revolution and they are azimuthly equally spaced about the axis of transducer rotation despite the fact that the motor accelerates and decelerates at least twice (i.e. for a dipole motor) during each revolution.

The importance of providing an exact number of acoustic energy pulses for each transducer revolution at equally spaced azimuthal positions can best be seen by reference to FIG. 4 which illustrates an acoustic energy reflection signal being presented on display device 26 as a two dimensional light intensity function f(k, 1) where 1 is a row (line) number on the display and k is a point (pixel) number on a line. The total number of lines in the image is L and the total number of pixels per line (equal to the total number of columns) is K. The value of f at spatial coordinates (k, 1) of FIG. 4 is equal to the amplitude (or time of arrival) of the reflection signal received by the logging tools receiver at azimuth k and depth 1. This value f(k, 1) will determine the intensity of the pixel (k, 1) on the display. The image on the display consists of, for example, 256 horizontal lines by 256 pixels per line. This represents 256 scan lines and 256 events per revolution of the transducer. Too much or too little recorded reflection information during a given revolution will distort the 256 pixel image. Thus, it can be seen that synchronizing the excitation, or pulsing, of the transducer to its rotation so that no more or no less than the full display of 256 pixels is produced each revolution.

While a particular embodiment of the present invention has been described and shown in FIG. 3, it will be understood that the circuit components are merely representative of such particular embodiment and various other types and values of circuit components may be utilized without departing from the spirit and scope of the invention as set forth in the appended claims. In accordance with such particular embodiment, the phase detector 51, low pass filter 52 and VCO 53 may preferably be packaged in a single CD 4046 chip supplied by RCA as shown in FIG. 5 with the circled numbers representing pin numbers. The following Table sets forth specific types and values of circuit elements for the embodiments of FIGS. 3 and 4.

| Reference Designation | Description |
| --- | --- |
| Phase Detector 51 | CD 4046 (RCA) |
| Low Pass Filter 52 | CD 4046 (RCA) |
| VCO 53 | CD 4046 (RCA) |
| Divide-By-Counter 54 | CD 4520 (RCA) |
| Resistor 48 and 59 | 10 K |
| Resistor 55 | 100 K |
| Capacitor 49 | 0.047 uf |
| Capacitor 57 | 0.1 uf |
| Capacitor 58 | 820 pf |
| +V | 5 VDC |

We claim:

1. A system for the acoustic logging of subsurface formations surrounding a borehole, comprising:
   (a) a transducer for directing pulses of acoustic energy toward the wall of said borehole and for receiving direct reflections of said acoustic energy from said borehole wall,
   (b) means for rotating said transducer about a rotational axis parallel to the axis of the borehole,
   (c) a wheel rotated in synchronism with said transducer and having a plurality of teeth equally spaced about its outer periphery,
   (d) a sensor spaced in juxtaposition with said wheel for detecting the rate of movement of said teeth past said sensor and for producing an electrical signal having a plurality of pulses with a repetition rate representative of the rate of movement of said teeth past said sensor, and
   (e) means responsive to said electrical signal for controlling said transducer to direct said pulses of acoustic energy toward said borehole wall at a repetition rate synchronized with the rotational speed of said transducer.

2. The system of claim 1 wherein said control means converts said electrical signal to a transducer excitation signal having a pulse rate synchronized to the repetition rate of the pulses comprising said electrical signal.

3. The system of claim 2 wherein said control means comprises:
   (a) an oscillator for generating said transducer excitation signal having a pulse rate that is a multiple N of the repetition rate of the pulses of said electrical signal,
   (b) means for dividing said transducer excitation signal by N, and
   (c) a detector for comparing the phase of said transducer excitation signal as divided by N with the phase of said electrical signal and for providing a phase error signal to said oscillator for synchronizing said excitation signal to said electrical signal so that the rate at which said transducer directs pulses of acoustic energy toward said borehole wall is synchronized with the rate of rotation of said transducer.

4. A system for the acoustic logging subsurface formations surrounding a borehole, comprising:
   (a) a transducer for directing pulses of acoustic energy toward the wall of said borehole and for receiving direct reflections of said acoustic energy from said borehole wall,
   (b) a motor for rotating said transducer about a rotational axis parallel to the axis of the borehole with a plurality of speed variations during each revolution, (c) a wheel rotated in synchronism with said motor and having a plurality of teeth equally spaced about its periphery, (d) a sensor spaced in juxtaposition with said wheel for detecting the rate of movement of said teeth past said sensor and for producing an electrical signal having a plurality of pulses with a repetition rate representative of the rate of movement of said teeth past said sensor, (e) oscillator for producing a transducer excitation signal having a pulse rate that is a multiple N of the pulse rate of said electrical signal, (f) a divide-by-N counter that divides the pulse rate of said transducer excitation signal by said multiple N, and (g) a phase detector for comparing said electrical signal with the output of said counter to provide a phase error signal for controlling said oscillator so that the pulse rate of said transducer excitation signal is phase locked to the pulse rate of said electrical signal wherein the rate at which said transducer directs acoustic energy pulses toward the borehole wall in synchronism with the speed variations of said motor during each revolution so that said acoustic energy pulses are directed from said transducer at equally spaced azimuthal positions about the rotational axis of said transducer.

5. A system for the acoustic logging of subsurface formations surrounding a borehole, comprising:

(a) a transducer for directing pulses of acoustic energy toward the wall of said borehole and for receiving direct reflections of said acoustic energy from said borehole wall, (b) a motor for rotating said transducer about a rotational axis parallel to the axis of the borehole at a rate of R revolutions per second with a plurality of acceleration and deceleration cycles per revolution, (c) a wheel having T teeth equally spaced about its outer periphery and rotated in synchronism with said motor, (d) a sensor spaced in juxtaposition to said wheel for detecting the rate of movement of said teeth past said sensor and for producing a $R \times T$ hertz electrical signal representative of the rate of movement of said teeth past said sensor each second, (e) a voltage controlled oscillator for producing a P hertz transducer excitation signal, (f) a counter that divides said transducer excitation signal by N to provide a P/N hertz counter signal, and (g) a phase detector for comparing the phase of said $R \times T$ hertz electrical signal with the phase of said P/N hertz counter signal to provide a phase error signal to control the voltage of said voltage controlled oscillator to cause said P hertz transducer excitation signal to be phase locked to said $R \times T$ hertz electrical signal so that said transducer excitation signal causes said transducer to direct P/R acoustic energy pulses toward the borehole wall at equally spaced azimuthal positions about said rotational axis for each revolution of said transducer.

6. The system of claim 5 wherein:
(a) R represents 6 revolutions per second,
(b) T represents 64 teeth,
(c) $R \times T$ represents a 384 hertz electrical signal,
(d) P represents a 1536 hertz transducer excitation signal,
(e) N represents a division of said transducer excitation signal by 4,
(f) P/N represents a 384 hertz counter signal, and
(g) P/R represents 256 acoustic energy pulses per revolution of said transducer.

* * * * *

UNITED STATES PATENT AND TRADEMARK OFFICE
CERTIFICATE OF CORRECTION

PATENT NO. : 4,969,128
DATED : November 6, 1990
INVENTOR(S) : Dennis et al.

It is certified that error appears in the above-identified patent and that said Letters Patent is hereby corrected as shown below:

The Title should read "BOREHOLE ACOUSTIC LOGGING SYSTEM HAVING SYNCHRONIZATION OF ACOUSTIC TRANSDUCER ROTATION AND OUTPUT"

Col. 6, line 59: Insert --of-- after "logging".

Col. 7, line 10, Insert --an-- before "oscillator"

Col. 7, line 24, Insert --is-- before "in"

Col. 8, line 11, "P" should be --P/N--.

Signed and Sealed this

Eighteenth Day of February, 1992

Attest:

HARRY F. MANBECK, JR.

*Attesting Officer*      *Commissioner of Patents and Trademarks*